US012137176B1

(12) United States Patent
Wan (10) Patent No.: US 12,137,176 B1
(45) Date of Patent: Nov. 5, 2024

(54) SYSTEMS AND METHODS FOR PROTECTING NETWORK BROADCAST MESSAGES

(71) Applicant: CABLE TELEVISION LABORATORIES, INC, Louisville, CO (US)

(72) Inventor: Tao Wan, Ottowa (CA)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/102,169

(22) Filed: Nov. 23, 2020

Related U.S. Application Data (60) Provisional application No. 62/938,870, filed on Nov. 21, 2019.

(51) Int. Cl.
| | |
|---|---|
| *H04L 29/06* | (2006.01) |
| *H04L 9/00* | (2022.01) |
| *H04L 9/32* | (2006.01) |
| *H04W 12/037* | (2021.01) |
| *H04W 12/106* | (2021.01) |

(52) U.S. Cl.
CPC ............ *H04L 9/3268* (2013.01); *H04L 9/006* (2013.01); *H04L 9/3247* (2013.01); *H04W 12/037* (2021.01); *H04W 12/106* (2021.01)

(58) Field of Classification Search
None
See application file for complete search history.

(56) References Cited

U.S. PATENT DOCUMENTS

| | | | |
|---|---|---|---|
| 8,606,324 B2 | 12/2013 | Murasawa | |
| 10,200,861 B2 | 2/2019 | Nair et al. | |
| 11,284,255 B1* | 3/2022 | Akkaya | ................. H04L 9/3239 |
| 11,432,148 B2 | 8/2022 | Liu et al. | |
| 2011/0070897 A1 | 3/2011 | Tang et al. | |
| 2013/0326224 A1 | 12/2013 | Yavuz | |
| 2016/0212632 A1 | 7/2016 | Katamreddy et al. | |
| 2018/0124602 A1 | 5/2018 | Nair et al. | |
| 2018/0124696 A1 | 5/2018 | Nair et al. | |
| 2018/0124697 A1 | 5/2018 | Nair et al. | |

(Continued)

FOREIGN PATENT DOCUMENTS

| | | | | |
|---|---|---|---|---|
| WO | 2010120837 A1 | 10/2010 | | |
| WO | WO-2018076798 A1 * | 5/2018 | ............. | H04L 29/06 |

*Primary Examiner* — Jeffery L Williams
(74) *Attorney, Agent, or Firm* — Josh C. Snider; Snider IP (57) ABSTRACT

A client-side electronic device includes a receiver, a processor, and a memory. The receiver communicates with a message server over a communication medium of a communication network. The memory stores computer-executable instructions, which, when executed by the processor, cause the device to receive, from the message server, a broadcast message, a timestamp associated with the broadcast message, and a first digital signature of the broadcast message and a second digital signature of the timestamp. The executed instruction further cause the device to verify an integrity of the broadcast message based the first or second digital signatures, determine a freshness of the broadcast message based on the received timestamp, calculate a trust state of the broadcast message based on the integrity verification and the freshness determination, and store the broadcast message in the memory along with the calculated trust state.

19 Claims, 5 Drawing Sheets

(56) References Cited

U.S. PATENT DOCUMENTS

| | | | |
|---|---|---|---|
| 2019/0288860 A1* | 9/2019 | Poltorak | ............. H04W 12/033 |
| 2019/0349765 A1 | 11/2019 | Kolekar et al. | |
| 2020/0059372 A1* | 2/2020 | Goeringer | ............. H04L 9/3268 |
| 2020/0267542 A1* | 8/2020 | Pronk | ................. H04W 12/037 |
| 2021/0018953 A1* | 1/2021 | Ford | ......................... G06F 1/14 |
| 2021/0111902 A1 | 4/2021 | Lee et al. | |
| 2021/0204129 A1 | 7/2021 | Yang et al. | |
| 2021/0258301 A1* | 8/2021 | Benjamin | ............ H04L 63/0823 |
| 2022/0272539 A1 | 8/2022 | Silva et al. | |
| 2022/0407721 A1* | 12/2022 | Queralt | ............... H04L 63/0815 |
| 2023/0224059 A1 | 7/2023 | Parkvall et al. | |

* cited by examiner

SYSTEMS AND METHODS FOR PROTECTING NETWORK BROADCAST MESSAGES

CROSS REFERENCE TO RELATED APPLICATIONS

This application claims the benefit of and priority to U.S. Provisional Patent Application No. 62/938,870, filed Nov. 21, 2019, the entire content and disclosure of which is incorporated by reference herein in its entirety.

BACKGROUND

The field of the disclosure relates generally to network messaging communications, and more particularly, to systems and methods for protecting broadcast messages from tampering and replaying attacks.

In conventional communication networks, and in particularly in the case of mobile networks, broadcasting messages have not been well protected. The lack of protection for broadcast messages has rendered broadcast messaging subject to significant spoofing and tampering. In the case of mobile subscribers, this lack of protection has been the root cause of many known attacks against the subscriber communications. Accordingly, there is a considerable desire in this field to fundamentally prevent such attacks. More specifically, there is a need to protect both broadcast messages and mobile broadcasting messages with respect to such security properties as message integrity, message uniqueness, and message freshness.

In two-party communications, message integrity may be protected by either symmetric-key based message authentication codes (MACs), or using asymmetric-key based digital signatures. For ease of explanation, the following description refers to a MAC as a type of digital signature, and to a message protected with either a MAC or another digital signature as being digitally signed. Key-based MAC solutions, however, remain a significant challenge for multiple-party communications, such as broadcasting messages over a network having a dynamic group membership, due to the fact that a symmetric key must be shared among all group members.

Additionally, replay attacks are another significant challenge to integrity protected broadcast messaging. In some conventional networks, for example a legitimate server (e.g., a base station) may broadcast a digitally-signed message, but a false "man-in-the-middle" base station may also receive the digitally-signed message and then re-broadcast it. A receiving client-side device (e.g., a user equipment (UE), in this example) will not be able to tell the difference between legitimate original digitally-signed message and the falsely replayed instance of the same message. Accordingly, there is a further desire in the field to more reliably guarantee the uniqueness and timeliness of broadcast messages to better prevent such replay attacks. Conventional solutions have focused on the inclusion of time-variant parameters, such as timestamps, with the original broadcast messages. However, this timestamp usage presumes synchronization between respective client-side and server-side clocks, which is not always the case. Furthermore, conventional solutions do not address scenarios where clocks on client-side and/or server-side may have been compromised. Thus, there is an additional need to protect the timestamp of a message in the presence of adversary, in addition to the message itself, with integrity.

SUMMARY

In an embodiment, a client-side electronic device is provided for receiving broadcast messages from a communication network. The device includes a receiver, a processor, and a memory. The receiver is configured for operable communication with, and receiving messages from, a first message server over a communication medium of the communication network. The memory is configured to store computer-executable instructions, which, when executed by the processor, cause the device to receive, from the first message server, a first broadcast message, a first timestamp associated with the first broadcast message, and a first digital signature of the first broadcast message and a second digital signature of the first timestamp. The executed instruction further cause the device to verify an integrity of the first broadcast message based on at least one of the first and second digital signatures, determine a freshness of the first broadcast message based on the received first timestamp, calculate a trust state of the first broadcast message based on the integrity verification and the freshness determination, and store the first broadcast message in the memory along with the calculated trust state.

In an embodiment, a central signing server is provided for a broadcast messaging system. The central signing server is in operable communication with a first message server of a plurality of message servers in the broadcast messaging system. The central signing server is configured to receive a digital signing request from the first message server. The digital signing request includes a broadcast message to be sent to a client in communication with the first message server. The central signing server is further configured to obtain a timestamp corresponding to the broadcast message, compute a digital signature over the received broadcast message and the obtained timestamp, and transmit a digital signing response to the first message server. The digital signing response includes the obtained timestamp and the computed digital signature.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged: such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As used herein, unless specified to the contrary, "modem termination system," or "MTS" may refer to one or more of a cable modem termination system (CMTS), an optical network terminal (ONT), an optical line terminal (OLT), a network termination unit, a satellite termination unit, and/or other termination devices and systems. Similarly, "modem" may refer to one or more of a cable modem (CM), an optical network unit (ONU), a digital subscriber line (DSL) unit/modem, a satellite modem, etc.

As used further herein, "CA" may refer to a certificate authority hosting a root certificate, and may further include, without limitation, one or more of a CA computer system, a CA server, a CA webpage, and a CA web service.

As used herein, a Public Key Infrastructure (PKI) uses a pair of cryptographic keys (e.g., one public and one private) to encrypt and decrypt data. PKI utilization enables, for example, devices to obtain and renew X.509 certificates, which are used to establish trust between devices and encrypt communications using such protocols as Transport Layer Security (TLS), etc. A PKI includes policies and procedures for encrypting public keys, as well as the creation, management, distribution, usage, storage, and revocation of digital certificates. The PKI binds the public keys to the identity of a person or legal entity, typically through a trusted Certificate Authority (CA). The PKI hierarchy identifies a chain of trust for a device or program, and further may provide secure software download requirements for the devices, and/or secure certificate injection requirements on the device manufacturers. The CA, the electronic devices, the device manufacturers, and users of the device interact over a PKI ecosystem.

As used herein, a "message authentication code" (MAC) may refer to a type of digital signature, and a message that is protected with either a MAC or another type of digital signature is referred to herein as being "digitally signed."

The embodiments herein provide innovative systems and methods for establishing reliable message integrity, message uniqueness, message freshness, and/or key management at the server-side of a communication network, while enabling secure verification thereof at the client-side of the communication network. The embodiments described herein further provide unique techniques for verifying timestamps of broadcast messages irrespective of a synchronization state between the client-side and the server-side. An exemplary communication network system architecture is described further below with respect to FIG. 1.

Figure 1:
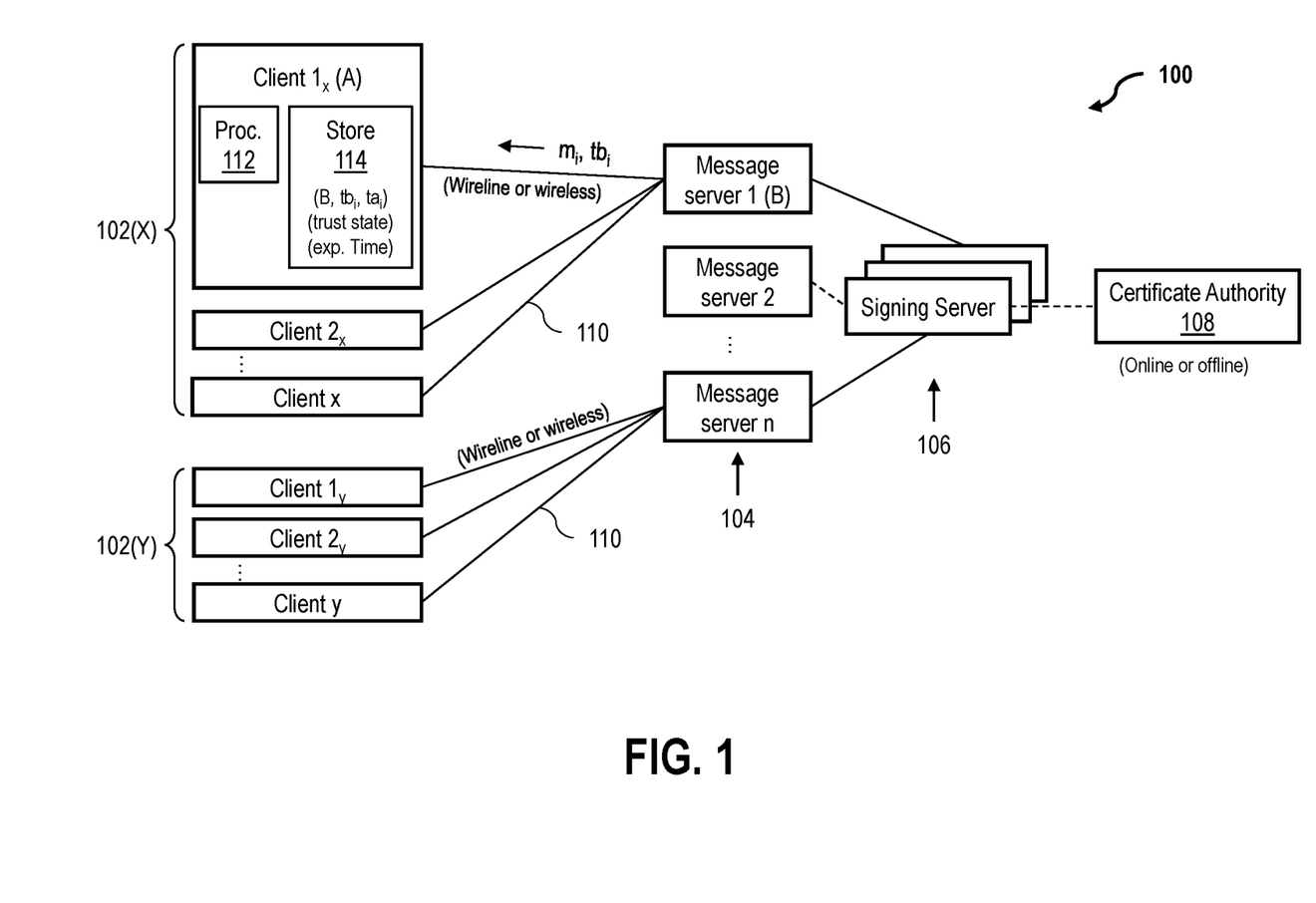
FIG. 1 is a schematic illustration of a communication system, according to an embodiment.

FIG. 1 is a schematic illustration of a communication system 100. In an exemplary embodiment, system 100 includes a plurality of clients 102, one or more message servers 104, and at least one signing server 106 in communication with a CA 108. Each of clients 102 may, for example, constitute an individual electronic computing device, such as a UE (e.g., where system 100 includes a mobile network), a Wi-Fi-enabled transceiver (e.g., where system 100 includes a Wi-Fi network), a modem or a cable modem (e.g., where system 100 includes a wireline, fiber, cable, or hybrid network), a router or residential gateway (e.g., where system 100 includes a local area network (LAN) or a home network), or a client group of 1-x, 1-y such client devices. Similarly, message server 104 may be at least one of a base station and a mobile core (e.g., in a mobile network), a eNB or a gNB (e.g., a 5G mobile network), a Wi-Fi access point (AP) (e.g., Wi-Fi network), and an MTS/CMTS (e.g., a wireline network). System may also include, for example, a converged cable access platform (CCAP) architecture for cable or fiber communication according to a data over cable service interface specification (DOCSIS) protocol.

In the exemplary embodiment, clients 102 are in operable communication with respective message servers over one or more communication media 110. Communication media 110 may include, for example, a wireline connection (e.g., fiber, cable, etc.), a licensed or unlicensed wireless communication channel (e.g., Wi-Fi, LAA, LTE, LTE-U, etc.), or a Citizens Broadband Radio Service (CBRS). Accordingly, clients 102 are configured for transceiver capability with the respective communication medium 110, and include at least one processor 112 and one or more memory storage devices 114 configured to store computer-executable instructions for processor 112, as well as broadcast messages M and/or timestamps received from message server 104, and certificates and/or keys from CA 108.

In some embodiments, a particular client 102 may further include, but is not limited to, a desktop computer, a laptop computer, a personal digital assistant (PDA), a cellular phone, a smartphone, a tablet, a phablet, or other web-based connectable equipment, such as an Internet of Things (IoT) device. For example, a UE client 102 may be a smartphone, and the network of system 100 may include a cellular network, such as, but not limited to, a 3GPP network, a 4G network, a 5G network, a 6G network, a MuLTEfire network, or another type of network over which the phone would attempt to communicate. For IoT devices, the network may be a private network or a specific network for that individual device, or for devices of similar types. For example, the network may be a network for IP cameras produced by a specific company, or IP cameras set-up at a specific location.

In the exemplary embodiment, protection of the message integrity of the messages broadcast from message server 104 to client 102 implements cryptographic techniques supporting key management, such as public key-based digital signatures and/or PKI. For ease of explanation, the following embodiments are described with respect to system 100 as a mobile network, client 102 as a UE, and message server as a base station (e.g., eNB, gNB, etc.) respectively.

In an exemplary embodiment, PKI-based digital signatures are utilized to protect broadcast messages by enabling messages broadcast from one party (e.g., message server 104) to be validated by many parties (e.g., clients 102) without having to share the signing key. The broadcasting messages M may themselves include a plurality of different message blocks, such as a Master Information Block (MIB) and System Information Blocks (SIBs). Accordingly, and as described further below with respect to FIGS. 2-4, message server 104 may protect broadcast messages M by employing digital signatures from signing server 106 to: (1) protect all message blocks of a message M together using a single digital signature; (2) protect a selected subset of message blocks together within a message M using a digital signature for just that subset; and (3) protect only selected fields within each message block with using a single digital signature for just those selected fields.

Using such cryptographic digital signatures, the individual clients 102 are enabled to verify the integrity of a received broadcast message M. Upon success or failure of the integrity verification at client 102, client 102 may perform one or more of the following actions: (i) upon a successful verification, client 102 may store the received broadcast message M in memory storage device 114 for future use; and (ii) upon a failed verification of a present broadcast message $M_i$, client 102 may utilize a prior broadcast message $M_{i-1}$ that has been previously successfully verified and stored in memory storage device 114. This successful prior broadcast message $M_{i-1}$ may then be used to provide to client 102 the communication services necessary to avoid the complete loss of services to client 102.

Known time-variant parameters include random numbers, sequence numbers, and timestamps. Random numbers are conventionally used in real-time interactive protocols, such as a challenge-response authentication protocol, when both parties involved in a two-way communication are online. However, in the case of non-interactive communication, each party would need to store the random numbers associated with all prior messages in order to verify the uniqueness of a newly received random number. This conventional technique thus requires one party to receive all messages from another party in order to verify the message uniqueness.

However, it should be noted that the use of random numbers alone does not guarantee the timeliness of non-interactive messages. Since, in mobile networks, UEs 102 often move from the range of one cellular station 104 to another, the respective UEs 102 may be in different states, and therefore, even though within operational range of the station 104, the UEs 102 may be unable to hear or listen to broadcasting channel 110, and thus may not receive all broadcasting messages M from the cell/station 104. Because the intrinsic properties of random numbers require all messages to be received from the other party, use of random numbers in mobile broadcasting communication is not suitable to guarantee the uniqueness of a received message M.

According to the present embodiments though, this problem is overcome through the implementation of sequence numbers in the broadcast messages instead of random numbers. Sequence numbers, similar to random numbers, are each themselves unique. Sequence number techniques differ, however, from random number techniques, in that sequence numbers are each incremented within a predetermined sequence. Therefore, receipt of a single sequence number is sufficient to enable the detection of a reply including any prior number in the sequence, thereby avoiding the need for the client to have to store all numbers in the sequence. That is, even if some broadcast messages are not heard by a UE 102 on channel 110, the UE may nevertheless be able to determine the message uniqueness by comparing the sequence number in the new message with a stored sequence number from a prior message.

In an exemplary embodiment, message server 104 may be configured to include a different sequence number in each broadcasting message M, in addition to other integrity protection techniques. In at least one embodiment, message server 104 includes a sequence number as part of the input to compute the digital signature of the message M. Alternatively, the sequence number may be included by signing server 106. In the exemplary embodiment, the sequence numbers are natural positive integers (e.g., beginning at values of 0, 1, or higher) and then incremented by consistent integer values of 1 or more with each succeeding message M, or portions thereof. Alternatively, the sequence number may be determined according to a number of time units between two time markers of a time counter (e.g., server clock).

According to these exemplary techniques, implementation of sequence numbering for the messages M broadcast within system 100 is particularly advantageous with respect to detecting and preventing the problem, described above, of man-in-the-middle replays of integrity-protected (e.g., digitally signed) messages. As described above, a convention UE is unable to tell the difference between an original digitally signed message from a legitimate base station, on the one hand, and a replay of that same message from man-in-the-middle false base station, on the other hand. According to the innovative sequencing techniques described herein though, a particular UE 102 will be able to discern between the two messages.

More particularly, due to the expected delay incurred for the false station to rebroadcast the message, UE 102 will expect to receive the original legitimate message prior to receiving the false rebroadcast message. Using the sequence number included in each message M, UE 102 (i.e., processor 112 thereof) is now able to reject the replayed message by determining that the original message had already been received (e.g., stored in memory 114), and that the newer received replay message containing the same sequence number is therefore not unique.

Additional broadcast message protection, and particularly in the case of mobile network implementations, may be desirable, such as in the case where some broadcast messages M may not be received by client 102, for example, due to a UE 102 going into idle mode, or moving out of the broadcast range of the respective message server 104. In such cases, UE 102 may not always receive the legitimate original message prior to the false replay message.

Some conventional techniques utilize timestamps to verify the timeliness of received messages. That is, in the case of mobile networks, broadcast messages may include a timestamp based on the time of the server-side (e.g., base station, eNB, gNB, etc.) broadcasting the message. These timestamps thus serve to eliminate the need to maintain the state for historical messages and the timestamps thereof. However, similar to the tampering challenges with respect to the broadcast messages, described above, the timestamps included therewith may also be subject to tampering. Additional advantageous techniques for protecting the integrity of timestamps are described further below with respect to FIG. 2.

Figure 2:
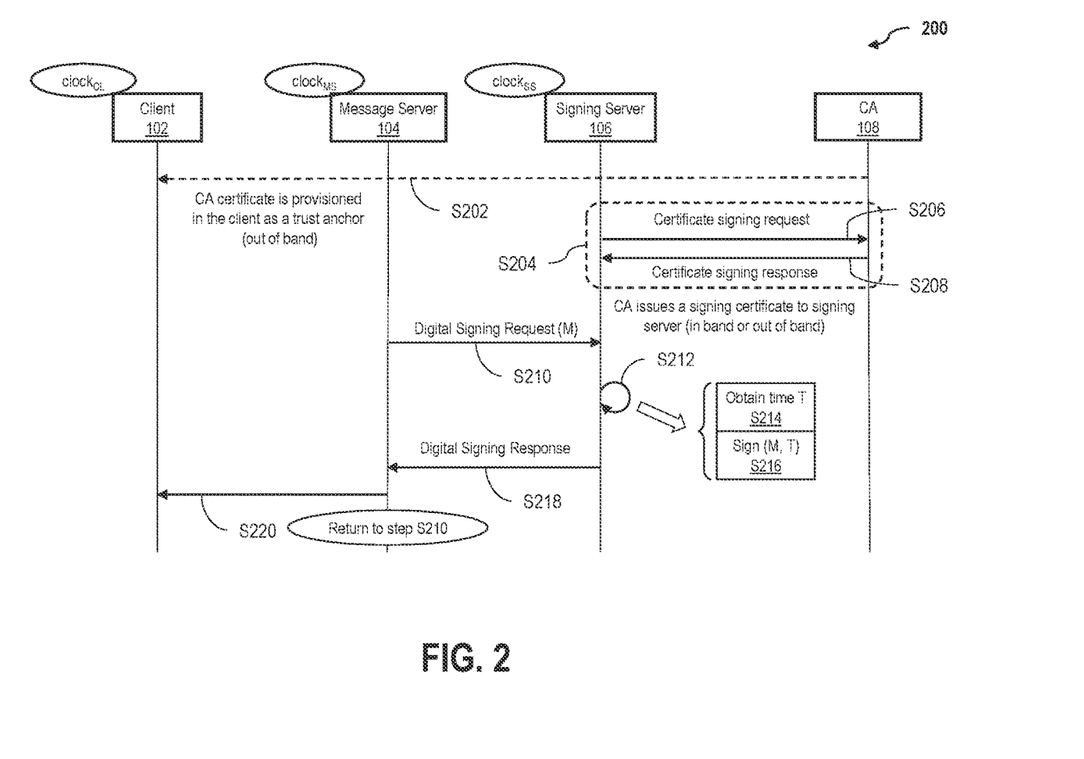
FIG. 2 is a sequence diagram of a message cryptographic signature process for the communication system depicted in FIG. 1.

FIG. 2 is a sequence diagram of a message cryptographic signature process 200 for communication system 100, FIG. 1. In the exemplary embodiment depicted in FIG. 2, process 200 is illustrated with respect to client 102, message server 104, signing server 106, and CA 108 of system 100.

In an embodiment, several steps or substeps may optionally be executed separately from process 200, or as preliminary steps thereof. For example, in step S202, CA 108 provisions a certificate in client 102 (e.g., within memory 114) as a trust anchor. In an embodiment of step S202, the certificate from CA 108 is provisioned out of band. In the case where client 102 is a UE, for example, the certificate may be received indirectly, such as through a low level connection with a nearby AP (e.g., or an eNB for a 3GPP network), through which the UE transmits a certificate request over an Extensible Authentication Protocol (EAP) for the AP to then forward over the network to an EAP authenticator, which may then route the request to the appropriate PKI portal to CA 108. An encapsulated certificate response may then be transmitted to the UE in a reverse fashion.

Additionally, in step S204, CA 108 may optionally issue a signing certificate to signing server 106 as a separate subprocess, or as additional preliminary steps to process 200. In some embodiments, step S204 is performed in band. In other embodiments, step S204 is performed out of band, similarly to step S202. In an exemplary embodiment, step S204 includes a first substep S206, in which signing server 106 transmits a certificate signing request to CA 108, and a second substep S208, in which CA 108 transmits a certificate signing response to signing server 106 that includes the signing certificate. In an exemplary embodiment, steps S202 through S208 are performed prior to signing server 106 receiving a message M from message server 104.

In the exemplary embodiment depicted in FIG. 2, cryptographic signature process 200 begins at step S210, in which message server 104 transmits a digital signing request, including the message M, to signing server 106 for digital signature. In step S212, signing server 106 executes a signature subprocess to respond to the digital signing request from message server 104. In an exemplary embodiment, step S212 includes a first substep S214, in which signing server 106 obtains a timestamp value T corresponding to the time the message M was sent from message server 104 (e.g., according to message server $clock_{MS}$), or according to the time the message M was received by signing server 106 (e.g., according to signing server $clock_{SS}$). In this embodiment, step S212 includes a second substep S216, in which signing server 106 cryptographically signs not only the message M, but also the timestamp value T, thereby providing an additional layer of integrity to not only the message M, but also the timestamp T.

In step S218, signing server 106 transmits a digital signing response to message server 104, which includes the original timestamp T, and both a cryptographically signed message M and a cryptographically signed timestamp T. In step S220, message server 104 broadcasts the original message M and timestamp T to client 102, along with the digitally signed message M and digitally signed timestamp T. Process 200 may then return to step S210, to repeat the cryptographic signature processing of the next message from message server 104. According to this innovative signature technique, client 102 is able to efficiently verify that the received message M and received timestamp T correspond to the digitally signed message and timestamp from signing server 106. Such verification may be performed in several ways.

For example, after receiving a broadcast message M, client 102 (e.g., a UE) may obtain its own local time (e.g., from client $clock_{CL}$), and then use this local time to verify the timestamp T included in the message M. If the difference in time between the local time and the timestamp T is within a predetermined acceptable range, processor 112 of client 102 may determine that the received message is considered to be fresh, and thus legitimate. This exemplary verification technique is of particular value where the time is well synchronized between client 102 and message server 104, since this technique would not require any state to be maintained on the client-side.

In some instances though, time synchronization between client and server is particularly challenging in global mobile networks that may include millions of base stations, as well as billions of UEs from many different vendors. Accordingly, in another exemplary embodiment, message timeliness may alternatively be verified based on the local times of both the particular client 102 and respective message server 104 involved in the broadcast message communication.

As an illustrative example, a UE A is in communication with a base station B, from which a message m_i is periodically broadcast with a timestamp tb_i (e.g., message server $clock_{MS}$). In this example, it is assumed that the message m_i including the timestamp tb_i cannot be tampered with, since both are integrity-protected by a digital signature according to process 200. Thus, the first time the broadcast message m_i(tb_i) is received by A from B, the processor of A is able check the timestamp tb_i against its own local time ta_i (e.g., client $clock_{CL}$). Where time synchronization between A and B is reliable, A is able to accept the message after verifying this check. In the case where the time synchronization is not known though, A may alternatively waive the importance of accepting the message from B against the risk of rejecting the message. If the importance of accepting the message outweighs the risk of rejecting the message, A will accept m_i.

Further to this example, once the message is accepted, A stores the values (B, tb_i, ta_i) in a trusted storage (e.g., memory 114) where only the executable instructions of the software processing for the broadcast messages (e.g., through processor 112) is allowed to access and write. In some embodiments, the memory of A may further store a state value (e.g., trusted or untrusted), and/or other attributes of the received message (e.g., expiration time). In this manner, such memory entries may be flagged as trusted once verified, for example, after authentication with the network of system 100. According to this example, upon receipt by A of a subsequent message m_j(tb_j) from B, A may be further configured to again obtain its own local time ta_j of receipt, and then verify m_j against the m_i stored in memory.

An exemplary coding scheme for computer-executable instructions for performing this verification may be according to the following:

If tb_j>tb_i,
{
   Xb=tb_j-tb_i; /*time elapse in B*/
}
Else
{
   m_j is not fresh; /*replay attacks, logging*/
   reject and return
}
if (ta_j>ta_i)
{
   Xa=ta_j-ta_i/*time elapse in A*/
}
Else
{
   A's time has been manipulated; /*logging, alerting*/
}
/*check tb_j against the network time Tn*/
If |ta_j-tb_j|<Y
{
   M_j is fresh;
   ta_i=ta_j/*update the stored time for A*
   /tb_i=tb_j/*update the stored time for B*/
}
Else
{
   M_j is not fresh, reject.
}

In at least one embodiment, each client 102 may be configured to utilize only the server-side time. That is, further to the example described immediately above, each client A may maintain the server time (e.g., $clock_{MS}$) Tn based on the timestamp tb_i included in each broadcast message m_i. In this manner, the time of the broadcast message may be the timestamp used for verifying the message freshness, or may be based on other time information included in the message for time synchronization purposes.

In an alternative embodiment, a particular client 102 (e.g., a UE) may maintain a single-server time, which is updated upon receipt of additional broadcast messages from that particular message server 104 (e.g., a base station). It may be noted though, that a challenge to utilization of a single-server time arises in the case where, if any base station is compromised and its time is manipulated (e.g., changed to a future time), the single-server time maintained by the UE would also be similarly manipulated upon receipt of a broadcast message from the compromised base station. In an exemplary embodiment, this threat is mitigated by further enabling client 102 to check the consistency of timestamps received among broadcasting messages from multiple message servers 104, and then update the server time accordingly.

In the case of a mobile network, the efficacy of this technique may vary according to the number of base stations available to the UE. For example, where only one base station/server is available to the UE, the UE will check the server time against its own local clock for consistency. In the case where two (or more) servers are available to the UE, both (or all) of their times may be checked against each other, as well as against the local clock time of the UE. If the times from the different servers are consistent with one another, either (or any) of the server times may be utilized to update the value Tn. Alternatively, an average of the server times may be used to update Tn. Where more than two servers are available, and where one server time is significantly different from the other servers, the outlying server time may be considered erroneous, and would therefore not be used to update Tn.

Further to this example, client 102 may also be configured to maintain multiple server times (e.g., the timestamps from multiple different $clocks_{MS}$). Depending on the number of server times that are available, the multiple server times may be maintained according to a variety of different scenarios that may be configured at the client-side. Thus, for the simplified case of client 102 maintaining two different server times can be maintained, client 102 may desire to maintain one server time for its own home network, and the other server time for non-home networks in which client 102 may operate. In this scenario, each server time may then be separately updated based on the time information received in the messages from the different message servers 104 (e.g., base stations) of the respective home network or non-home network. In an exemplary embodiment, each such separate update may individually be according to the single-server example described above.

In the exemplary embodiment, system 100 may be further configured to protect all received time information, as well as other state information, which is used to generate and validate timestamps or time counters, so that only an authorized party is able to access and modify the time information. As one illustrative example, individual processors of claim 102, message server 104, and/or signing server 106 are configured such that only a particular software module responsible for using/processing the time information is granted access to the time information and/or other related state information.

For the embodiments described herein, the respective digital signatures may be based on asymmetric cryptographic techniques utilizing a keypair having a public and a private key, such as PKI, and may be irrespective of the particular asymmetric algorithm used. In some embodiments, the public key is in a raw format. In other embodiments, the public key may be in a certificate format (e.g., an X.509 certificate). In the case where a raw public key utilized, the root public key may additionally contain annotating information, such as a key identifier.

The public keys utilized by the embodiments herein may be (i) flat, or (ii) hierarchical (e.g., a certificate chain). In the case where the public key is hierarchical, the hierarchical key structure(s) may take several forms. For example, an operator may implement its own independent key hierarchy. In this case, the operator may have its own root key, and then use that root key to certify the next intermediate keys, as well as subsequent keys thereafter. In the case where the keys are in certificate format, the operator would utilize the PKI to manage the lifecycle of the certificates as its own CA, or may alternatively outsource the PKI to a trusted third party CA (e.g., CA 108).

Alternatively, system 100 may utilize a trusted third party, such as a Global System for Mobile communications Association (GSMA) server as the root of the key hierarchy. In this example, some operators within system 100 may maintain child sub-key hierarchies under the root of the key hierarchy. In some embodiments, multiple roots may coexist, and each such root may operate to serve a particular subset of operators. In at least one embodiment, trusted third party roots may further coexist with the individual operator root.

In the case of a flat public key structure, trust in each public key must be established individually, as opposed to the hierarchical public key structure, where trust may be established directly in a leaf public key (i.e., the associated private key that the used to sign broadcasting messages), or indirectly from the trust of any one of its predecessor public keys, including, for example, an intermediate public key or the root public key. In some embodiments, trust in a public key is established on-the-fly. In other embodiments, trust in a public key is established by pre-configuration.

In the case of on-the-fly trust, a public key may be trusted when the key is first received from a particular message server/base station 104, and then stored locally (e.g., memory 114, FIG. 1) as a trusted key. Accordingly, upon receipt of a subsequent message from the same message server 104, that client 102 may check the signing key of the new message against the stored trust anchor.

Alternatively, in the case where a corresponding trust anchor does not exist on the client-side (i.e., not stored in memory 114), the digitally signed message may not be verified for its signature according to the techniques described immediately above. In this case, client 102 may instead proceed to establish a mutually-authenticated connection with the network of system 100. Upon successful connection, the network may then send client 102 a trusted public key for the particular message server 104, or may send client 102 a list of public keys for multiple servers/base stations 104. In an exemplary embodiment, the mutually-authenticated connection is established and the public key(s) is(are) sent during device provisioning (e.g., step S202), or alternatively, after the deployment of devices, such as when a user starts to use the respective electronic device or module of client 102. In the case where a list of trusted public keys is sent, the list may be pre-configured within client 102 (e.g., inside of a Universal Subscriber Identity Module (USIM) or Mobile Equipment (ME)) by a trusted party, such as a USIM vendor, a UE vendor, or a network operator.

Where a hierarchical key structure is implemented, multiple public keys may be required in order to validate a digital signature if the public key associated with a signing key is not itself directly trusted. In this case, if the public keys are in the format of public key certificates, signing server 106 and CA 108 may operate to implement key chaining through a certificate chain to establish trust in the signing key. In the case where raw public keys are utilized, the public keys may alternatively be annotated with additional information that may be to establish the trust in a signing key.

Accordingly, one key chaining technique may utilize a higher level key to digitally sign a lower level key, and then include this digital signature along with the raw public key. An illustrative example of such a keychain may be according to:

key3, key3-signature-signed-by-key2|
key2, key2-signature-signed-by-key1|
key1, key1-signature-signed-by-trusted-anchor key Thus, for this example, where key3 is used to sign a particular broadcasting message M, the key3-signed message is further signed by key2, key2 is further signed by key1, which is itself signed by a trusted anchor provisioned inside the device (e.g., step S202).

The present embodiments further implement one of two protection models to protect the private key that is used to digitally sign a broadcast message M: (1) local signing; and (2) remote signing.

For the local signing model, a particular message server 104 (e.g., a gNB) may be configured to locally store (in a memory device thereof, not shown) a private key, and then use the stored private key to sign the broadcast messages. In an exemplary embodiment, this private key is further protected within the server utilizing access control and/or a trusted execution environment. For example, the digitally signature process for a broadcast message may be executed within the trusted execution environment (e.g., SGX or TrustZone). According to this example, if a gNB is compromised, the private key may be still nevertheless protected to some degree, depending how much control of the gNB is obtained by an compromising attacker. According to this model, message server 104 and signing server 106 may constitute a single server unit.

In contrast, for the remote signing model, due to the lack of physical security available to some servers (e.g., gNB), an additional layer of security is provided through having the message signing process performed by a central signing server 106 (e.g., in a secure environment), which may be separate and remote from the individual message servers 104. Thus, in the case of a mobile network, a gNB is able to send a message, or a set of messages, to signing server 106 to be signed. Signing server 106 is then able to render the appropriate decision steps or calculations necessary to determine whether to sign the received messages from the digital signing requests (e.g., step S210) from the gNB 104. Accordingly, when signing server 106 determines that a message is to be signed, signing server 106 uses its private key to sign the particular message and return that signed message to the gNB 104 for broadcast to a particular client/UE 102.

In an exemplary embodiment, the digital signing request (e.g., step S210) may be sent transmitted to signing server 106 any time before the message needs to be broadcast to one or more clients 102. In at least one embodiment, in the case where a sequence number and/or time-variant is/are included in the signed message from signing server 106, message server 104 may be further configured such that such sequence numbers and/or time-variants are pre-computed at message server 104, and then included in the digital signing request of step S210.

In some embodiments, the decision(s) from signing server 106 as to whether to sign a particular message may be based on the policy or result of the attestation of the particular message server 104 transmitting the digital signing request. For example, if a gNB is considered to be in a not-secure state, signing server 106 may reject the digital signing request for the message contained therein. According to this advantageous embodiment, by implementing remote signing by a central signing server 106, the private key that is used for message signing is stored in the remote server of signing server 106, and not locally in a message server/gNB 104, thereby preventing the risk to the private key from a compromised message server 104, such as in the case of a gNB that may lack physical security.

According to the innovative systems and methods described above, significant improvements over conventional broadcast message protection techniques are demonstrated. The embodiments herein, through the innovative disposition of a central signing server, provide advantageous security protection to keys and certificates that are rendered inaccessible to attackers that may compromise various physically-unsecured servers/stations. Through the additional protection of both the broadcast message and the timestamp thereof, the embodiments herein additionally provide advantageous capability for the client to itself verify the integrity, uniqueness, and freshness of received broadcast messages. These respective server-side and client-side broadcast message protection improvements are further advantageous in that they may be implemented separately, or together.

Additional implementations and variations on the above systems and methods are described further below with respect to FIGS. 3 and 4.

Figure 3:
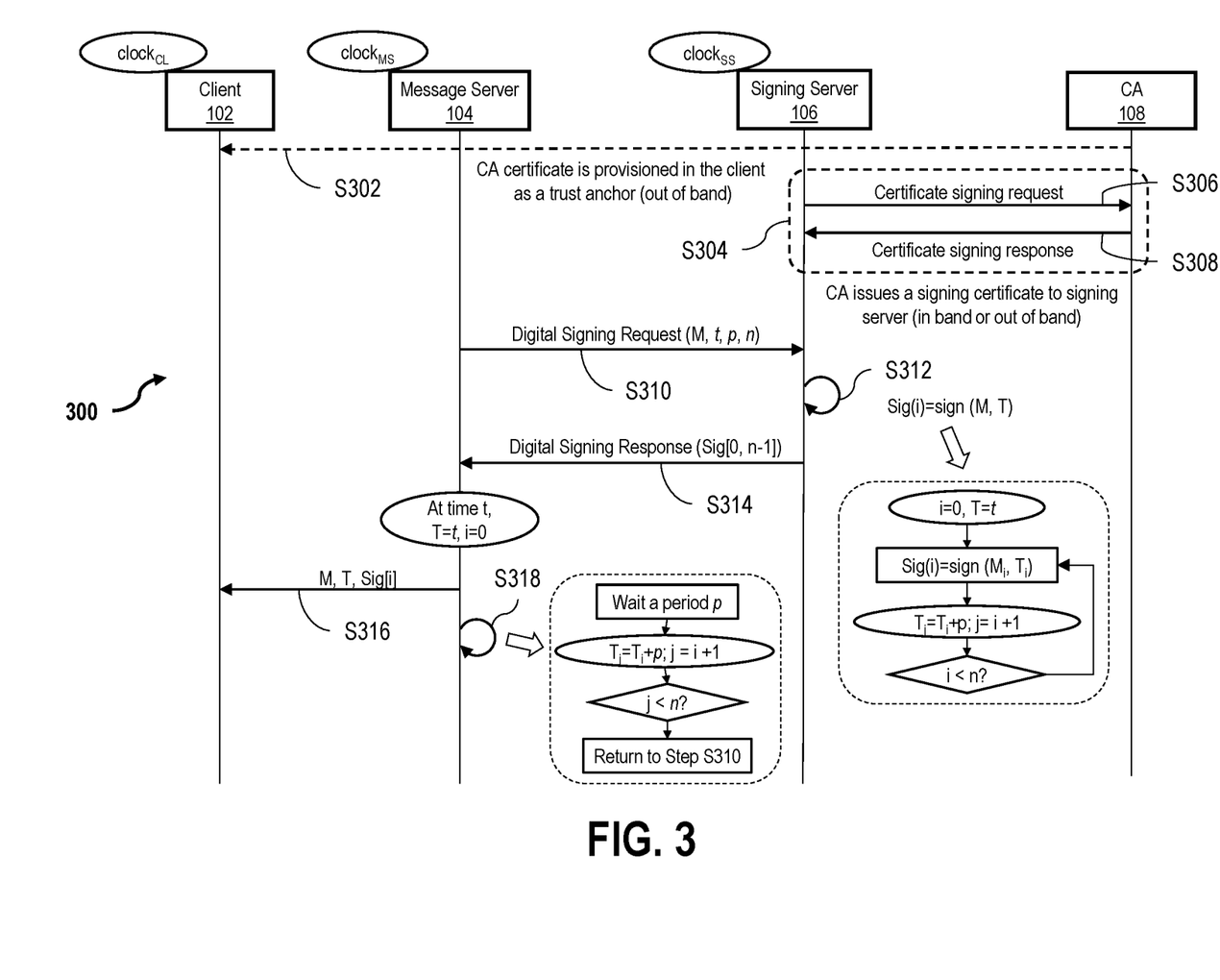
FIG. 3 is a sequence diagram of an iterative message cryptographic signature process for the communication system depicted in FIG. 1.

FIG. 3 is a sequence diagram of an iterative message cryptographic signature process 300 for communication system 100, FIG. 1. In the exemplary embodiment depicted in FIG. 3, process 300 is similar in many respects to process 200, FIG. 2, and is also implemented with respect to client 102, message server 104, signing server 106, and CA 108 of system 100, and may optionally include steps S302 and S304, and substeps S306 and S308 of step S304, as a preliminary subprocess of process 300, or as individual processing steps separate from process 300.

More particularly, in step S302, CA 108 provisions a certificate in client 102 as a trust anchor (e.g., out of band), similar to step S202, FIG. 2. In step S304, CA 108 may, similar to step S204, FIG. 2, issue a signing certificate to signing server 106 (e.g., in band or out of band), according to a first substep S306, in which signing server 106 transmits a certificate signing request to CA 108, and a second substep S308, in which CA 108 transmits a certificate signing response to signing server 106 including the signing certificate. As described above though, the signing request of substep S306 and the signing response of substep S308 may be certificate-based or utilize raw public keys, and according to flat or hierarchical key structures and key chaining techniques.

Process 300 differs though, from process 200, FIG. 2, in that process 300 illustrates the case where a particular message server 104 sends a message M to signing server 106 along with timing information regarding when the first signed message is to be sent out to individual clients 102, the time interval for the next signed message to be sent to clients, and also the number of times that each message shall be signed. In this illustrative example, the time at which the first signed message is to be sent to the client is represented by t, p represents the time interval after which each next signed message is sent, and n represents the total number of times that a message M shall be signed, along with the corresponding time at which there message M will be sent to clients.

Thus, in the exemplary embodiment depicted in FIG. 3, cryptographic signature process 300 begins at step S310, in which message server 104 transmits a digital signing request, including the message M, the initial time t, the time interval p, and the value n, to signing server 106 for digital signature of the message M.

In step S312 (assuming that message server 104 is determined to not be compromised), signing server 106 digitally signs the message M contained within the digital signing request from message server 104, and also a timestamp T, similar to step S212, FIG. 2. Step S312 though, differs from step S212 in that, for the first message $M_i$ to be sent to client 102 (e.g., i=0), instead of obtaining a server timestamp, signing server 106 uses the initial time t, which is included in the digital signing request, as the timestamp T to be signed (i.e., T=t). In an exemplary embodiment of step S312, after signing ($M_i$, T), signing server 106 may be further configured to increment the timestamp value T by the time interval p (i.e., $T_j=T_i+p$), and increment the sequence value of the message M by 1 (i.e., j=i+1). If j is less than the value n, signing server 106 may then sign the next message $M_j$ to be sent to client 102 (or the next message in a group of messages sent by message server 104 for digital signatures).

In step S314, signing server 106 transmits a digital signing response to message server 104, which includes both a digitally signed message M and a digitally signed timestamp T. It may be noted that, for this example, signing server 106 need not also transmit the unsigned value for the timestamp T in addition to the digitally signed timestamp T, because at time t, T-t, and message server 104 already has the time t, which was sent to signing server 106 in the original digital signing request from step S310. Accordingly, at time t, in step S316, message server 104 broadcasts the first message $M_i$ and timestamp $T_i$ to client 102, along with the first digitally signed message $M_i$ and digitally signed timestamp $T_i$.

In step S318, process 300 may then instruct message server 104 to also increment the time value t by the time interval p such that $T_j=T_i+p$ and j=i+1. In this manner, message server 104 and signing server 106 remain coordinated by sequencing, and irrespective of synchronization between their respective clocks. In an exemplary embodiment of step S318, if j is less than the value for n, at message server 104, process 300 may then return to step S310, and then repeat the iterative cryptographic signature processing of the next message M to be sent to client 102.

The exemplary embodiment depicted in FIG. 3 thus illustrates an advantageous implementation of the embodiments described above, but in the case where it is desirable to broadcast the messages according to a particular timing schedule, and where synchronization between the respective clocks within system 100 is less important, or impractical.

Figure 4:
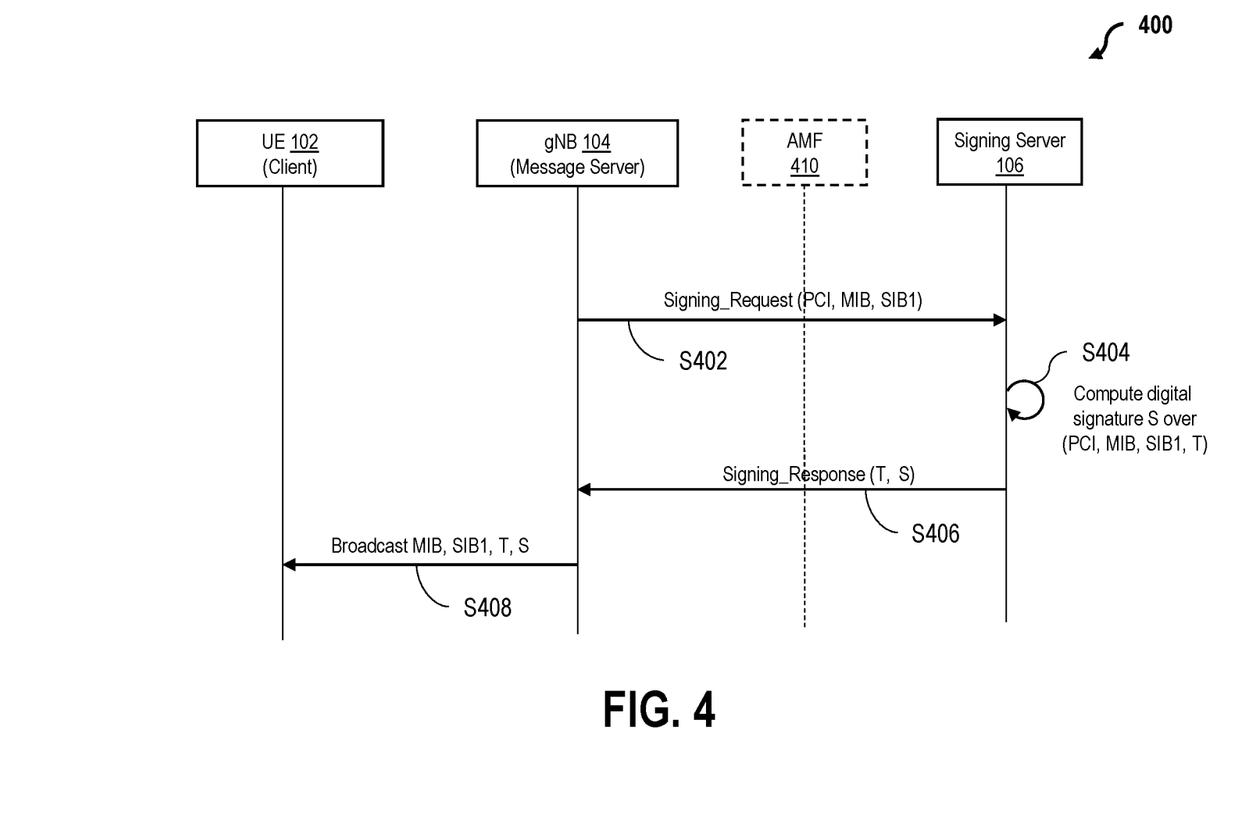
FIG. 4 is a sequence diagram of a message block cryptographic signature process for a mobile network architecture of the communication system depicted in FIG. 1.

FIG. 4 is a sequence diagram of a message block cryptographic signature process 400 for a mobile network architecture of communication system 100, FIG. 1. In the exemplary embodiment depicted in FIG. 4, process 400 is similar in several respects to process 200, FIG. 2, and process 300, FIG. 3, and is also implemented with respect to client 102, message server 104, and signing server 106. In this particular example though, client 102 is depicted as a UE, and message server 104 is depicted as a gNB. Process 400 differs though, from processes 200 and 300, in that process 400 illustrates an exemplary case where digital signature protection is sought for a selected subset of message blocks of a message M.

Accordingly, message block cryptographic signature process 400 begins at step S402, in which gNB 104 transmits a digital signing request, including the Physical layer Cell ID (PCI) block, the MIB, and the first SIB (i.e., SIB1) of a message M, to signing server 106 for digital signature of the message blocks. In step S404 (assuming that gNB 104 is determined to not be compromised), signing server 106 computes the digital signature S over each of the message blocks PCI, MIB, and SIB1, and also over a timestamp T, which may be obtained or sequenced according to one or of the subprocesses described above. In an exemplary embodiment of step S404, signing server 106 signs the message block and timestamp such that S-sign(PCI, MIB, SIB1, T).

In step S406, signing server 106 transmits a digital signing response to gNB 104, which includes both the computed digital signature S and an unsigned timestamp T. Accordingly, in step S408, gNB 104 broadcasts the MIB and SIB1 message blocks to UE 102, along with the unsigned timestamp T and the computed digital signature S, which includes a digitally signed PCI, MIB, SIB1, and timestamp T. In an exemplary embodiment, one or more of the communication steps between gNB 104 and signing server 106 may be optionally facilitated through use of an access and mobility management function (AMF) 410, such as an AMF used in mobile network.

According to this exemplary embodiment, UE 102 is thus enabled to verify the message integrity, uniqueness, and freshness of both the MIB and SIB1 message blocks of the message similarly to the client-side message verification techniques described above. According to this exemplary embodiment, the person of ordinary skill in the art will comprehend that the principles described herein are not limited to single messages or groups of messages, or to only specific types of communication networks or systems, but are instead broadly applicable to the broadcasting of messages and groups of messages in general, and/or the message block components thereof.

Figure 5:
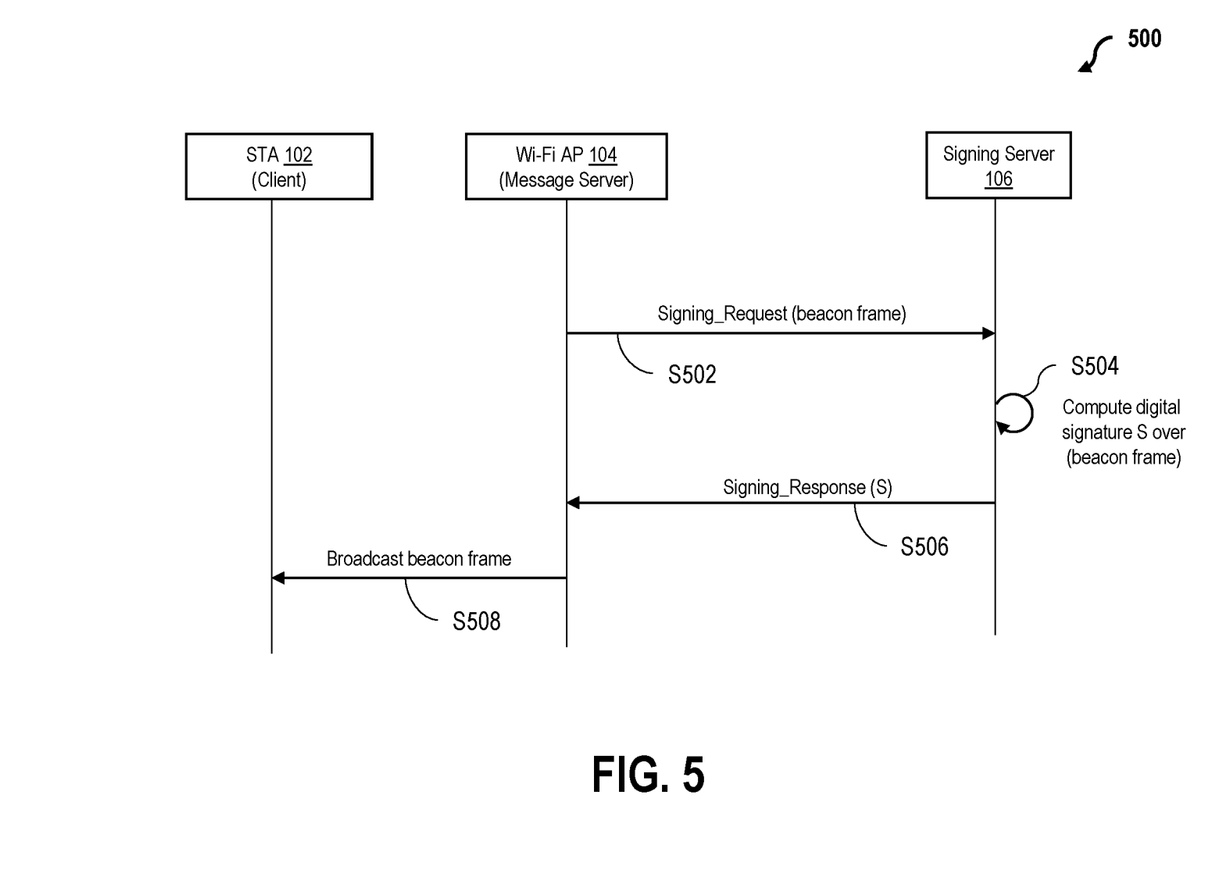
FIG. 5 is a sequence diagram of a beacon frame cryptographic signature process for a Wi-Fi network architecture of the communication system depicted in FIG. 1.

FIG. 5 is a sequence diagram of a beacon frame cryptographic signature process 500 for a Wi-Fi network architecture of communication system 100, FIG. 1. In the exemplary embodiment depicted in FIG. 5, process 500 is similar in several respects to process 400, FIG. 4, and is also implemented with respect to client 102, message server 104, and signing server 106. In this particular example though, client 102 is depicted as a STA, and message server 104 is depicted as a Wi-Fi AP. Process 500 further differs from process 400 in that process 500 illustrates an exemplary case where digital signature protection is sought for a beacon frame of a message M.

Accordingly, beacon frame cryptographic signature process 500 begins at step S502, in which AP 104 transmits a digital signing request, including the beacon frame of a message M, to signing server 106 for digital signature. In step S504 (assuming that AP 104 is determined to not be compromised), signing server 106 computes the digital signature S over the beacon frame. It may be noted that, because a beacon frame transmitted by a Wi-Fi AP includes its own timestamp, signing server 106 need not separately obtain the timestamp of the message M. A digital signature of the beacon frame will also sign the included timestamp therein. In step S506, signing server 106 transmits a digital signing response to AP 104, which need only include the computed digital signature S. Accordingly, in step S508, AP 104 broadcasts the beacon frame to STA 102.

According to this exemplary embodiment, STA 102 is thus enabled to verify the message integrity, uniqueness, and freshness of the beacon frame in a manner similar to the client-side message verification techniques described above. According to this exemplary embodiment, the person of ordinary skill in the art will comprehend that the principles described herein are also not limited to single messages or groups of messages.

As illustrated in the several embodiments described above, a timestamp may be signed separately from, or together with, an associated broadcast message or message blocks/portions thereof. Protection may thus be provided by a single signature (i.e., when signed together), or by two or more separate signatures (i.e., when signed separately, or as part of a key chain).

The present embodiments are therefore of particular usefulness in the case where a client receives broadcast messages from multiple messages servers. For example, a UE may scan multiple cells in a mobile network, or a STA may scan multiple APs in a Wi-Fi network.

The innovative timestamp protection techniques described herein further provide additional verification capabilities across the relevant network, since, according to the present systems and methods, a timestamp associated with a broadcast message may be checked against any one of: (a) the local time of the client; (b) a timestamp associated with a previously received broadcast message from the same message server; and (c) a timestamp associated with a broadcast message from a different message server.

The present embodiments are still further advantageous over conventional message integrity techniques, in that the techniques described herein may advantageously utilize both symmetric key-based message authentication codes (MACs) and/or asymmetric key-based digital signatures for integrity protection The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on vehicles, stations, nodes, or mobile devices, or associated with smart infrastructures and/or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In the exemplary embodiment, a processing element may be instructed to execute one or more of the processes and subprocesses described above by providing the processing element with computer-executable instructions to perform such steps/substeps, and store collected data (e.g., time variant parameters, digital signatures, certificates, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

Furthermore, the embodiments described herein improve upon existing technologies, and improve the functionality of computers, by more reliably protecting the integrity of broadcast messages and timestamps at the server-side, and by further enabling the easier and more efficient verification of a received broadcast message at the client-side. The present embodiments therefore improve the speed, efficiency, and reliability in which such determinations and processor analyses may be performed. Due to these improvements, the aspects described herein address computer-related issues that significantly improve the security of broadcasting messages in comparison with conventional techniques. Thus, the aspects herein may be seen to also address computer-related issues such as communication security between electronic computing devices or systems, for example.

Exemplary embodiments of systems and methods for broadcast messaging protection are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A client-side electronic device for receiving cellular broadcast messages from a cellular communication network, comprising:
   a receiver configured for operable communication with a first message server over a communication medium of the communication network;
   a processor including a memory configured to store computer-executable instructions, which, when executed by the processor, cause the device to:
      receive, from the first message server, (i) a first cellular broadcast message of a plurality of cellular broadcast messages, (ii) a first timestamp associated with the first cellular broadcast message, and (iii) a digital signature for the first cellular broadcast message and the first timestamp;
      verify an integrity of the first cellular broadcast message and the first timestamp based on the digital signature for the first cellular broadcast message and the first timestamp;
      determine a freshness of the first cellular broadcast message based on the received first timestamp;
      establish a trust state of the first cellular broadcast message based on the integrity verification and the freshness determination; and
      store the first broadcast message in the memory along with the established trust state,
   wherein the first cellular broadcast message includes a first unique sequence number of a series of sequence numbers,
   wherein the first unique sequence number distinguishes the first cellular broadcast message from other cellular broadcast messages in the plurality of cellular broadcast messages, and
   wherein the first timestamp is associated with the first cellular broadcast message based on the first unique sequence number.

2. The device of claim 1, comprising at least one of a user equipment (UE), a router, a residential gateway, a desktop computer, a laptop computer, a personal digital assistant (PDA), a cellular phone, a smartphone, a tablet, a phablet, and an Internet of Things (IoT) device.

3. The device of claim 1, wherein the first message server includes at least one of a base station, a mobile core of a mobile network, an eNodeB (eNB), and a gNB.

4. The device of claim 1, wherein the communication medium includes at least one of a licensed wireless communication channel, an unlicensed wireless communication channel, and a Citizens Broadband Radio Service (CBRS).

5. The device of claim 1, wherein each of the digitally signed version of the first cellular broadcast message and the digitally signed version of the first timestamp are based on a raw public key, and wherein the computer-executable instructions further cause the device to verify the integrity of the first cellular broadcast message by comparing a trust anchor stored within the memory to a key identifier annotated to the raw public key.

6. The device of claim 1, wherein each of the digitally signed version of the first cellular broadcast message and the digitally signed version of the first timestamp are based on a public key infrastructure (PKI) certificate, and wherein the computer-executable instructions further cause the device to verify the integrity of the first cellular broadcast message by comparing the PKI certificate to a pre-provisioned trust anchor certificate stored in the memory.

7. The device of claim 6, wherein the PKI certificate comprises an X.509 certificate.

8. The device of claim 6, wherein the receiver is further configured to receive the pre-provisioned trust anchor certificate from a PKI portal of a trusted certificate authority (CA).

9. The device of claim 8, further comprising a transmitter configured to transmit, prior to receipt of the pre-provisioned trust anchor certificate by the receiver, a certificate request indirectly to the CA over an extensible authentication protocol (EAP).

10. The device of claim 9, wherein the transmitter is further configured to transmit the certificate request out of band, and wherein the receiver is further configured to receive the pre-provisioned trust anchor certificate out of band.

11. The device of claim 1, further comprising a local clock, and wherein the computer-executable instructions further cause the device to determine (i) the freshness of the first cellular broadcast message by comparing the received first timestamp to a local time of the local clock, and (ii) that the first cellular broadcast message is fresh based on a difference between the received first timestamp and the local time being within a pre-determined range.

12. The device of claim 1, wherein the computer-executable instructions further cause the device to determine the freshness of the first cellular broadcast message.

13. The device of claim 1, further comprising a local clock, and wherein the computer-executable instructions further cause the device to store a local time of the local clock to correspond with the received first timestamp that has been verified to be fresh.

14. The device of claim 1, wherein the computer-executable instructions further cause the device to:
receive, from the first message server, a second cellular broadcast message and a second timestamp corresponding to the second cellular broadcast message; and
check the freshness of the second cellular broadcast message by comparing the second timestamp of the second cellular broadcast message to the first timestamp of the first cellular broadcast message stored in the memory.

15. The device of claim 14, wherein the computer-executable instructions further cause the device to:
receive, from a second message server, a third cellular broadcast message and a third timestamp corresponding to the third cellular broadcast message; and
check the freshness of the third cellular broadcast message from the second message server by comparing the third timestamp of the second cellular broadcast message received from the second message server to the first timestamp of the first broadcast message received from the first message server.

16. The device of claim 1, wherein the cellular communication network is at least one of a 3GPP network, a 4G network, a 5G network, and a 6G network.

17. The device of claim 1, wherein receipt of the digital signature for the first cellular broadcast message and the first timestamp enables the client-side electronic device to verify the first timestamp irrespective of a synchronization state between the client-side electronic device and the first message server.

18. The device of claim 1, wherein the first timestamp corresponds to a time the first cellular message was sent from the first message server, according to a message server clock of the first message server, to a signing server configured to generate the digital signature for the first message server.

19. The device of claim 1, wherein the first timestamp corresponds to a time the first cellular message was received from the first message server by a signing server configured to generate the digital signature for the first message server, according to a signing server clock of the signing server.

* * * * *